(12) United States Patent
Youn (10) Patent No.: US 10,536,572 B2
(45) Date of Patent: Jan. 14, 2020

(54) EMERGENCY LIFESAVING SYSTEM AND EMERGENCY LIFESAVING METHOD USING THE SAME

(71) Applicant: AHRANTA CO.,LTD., Seoul (KR)

(72) Inventor: Sang Kwon Youn, Seoul (KR)

(73) Assignee: AHRANTA CO., LTD., Seoul (KR)

( * ) Notice: Subject to any disclaimer, the term of this patent is extended or adjusted under 35 U.S.C. 154(b) by 0 days.

(21) Appl. No.: 16/131,353

(22) Filed: Sep. 14, 2018

(65) Prior Publication Data
US 2019/0014204 A1 Jan. 10, 2019

Related U.S. Application Data

(63) Continuation of application No. PCT/KR2017/015103, filed on Dec. 20, 2017.

(30) Foreign Application Priority Data

Feb. 10, 2017 (KR) .......................... 10-2017-0018897

(51) Int. Cl.
*H04M 11/04* (2006.01)
*H04M 1/00* (2006.01)
(Continued)

(52) U.S. Cl.
CPC ........ *H04M 1/72541* (2013.01); *G06Q 10/10* (2013.01); *G06Q 50/265* (2013.01);
(Continued)

(58) Field of Classification Search
CPC ......... H04M 1/72541; H04M 1/72519; H04M 1/72536; G01S 19/14; G06Q 50/10;
(Continued)

(56) References Cited

U.S. PATENT DOCUMENTS

2002/0102996 A1* 8/2002 Jenkins .................. H04L 51/38
455/456.3
2006/0017612 A1* 1/2006 Nagatani ............... G01S 5/0027
342/357.64
(Continued)

FOREIGN PATENT DOCUMENTS

KR 10-2013-0029862 A 3/2013
KR 10-2015-0006494 A 1/2015
(Continued)

OTHER PUBLICATIONS

International Search Report issued in PCT/KR2017/015103; dated Mar. 28, 2018.

*Primary Examiner* — Rafael Pérez-Gutiérrez
*Assistant Examiner* — Mark G. Pannell
(74) *Attorney, Agent, or Firm* — Studebaker & Brackett PC (57) ABSTRACT

An emergency lifesaving system is provided. The emergency lifesaving system includes a wireless terminal configured to download a program thereto via the Internet; a downloadable program configured to be downloaded to the wireless terminal via the Internet; a control server configured to communicate with the wireless terminal control part to determine whether a control signal operating the GPS receiver, the microphone, and the camera of the wireless terminal is generated; and a dangerous situation handling terminal including a receiver configured to receive emergency scene information by communicating with the control server, an emergency scene information output unit configured to output the emergency scene information received by the receiver to determine a level of a danger at a scene of emergency, and a situation handling unit configured to handle an emergency situation according to the level of the danger at the scene of emergency.

4 Claims, 5 Drawing Sheets

(51) Int. Cl.
*H04N 5/232* (2006.01)
*H04M 1/725* (2006.01)
*H04W 4/029* (2018.01)
*H04W 4/90* (2018.01)
*G06Q 10/10* (2012.01)
*G06Q 50/26* (2012.01)
*H04M 1/656* (2006.01)

(52) U.S. Cl.
CPC .............. *H04W 4/029* (2018.02); *H04W 4/90* (2018.02); *H04M 1/656* (2013.01); *H04M 2250/10* (2013.01)

(58) Field of Classification Search
CPC ...... G06Q 50/265; H04W 4/90; H04W 4/029; G08B 25/016
USPC ....................................................... 455/404.2
See application file for complete search history.

(56) References Cited

U.S. PATENT DOCUMENTS

| | | | | |
|---|---|---|---|---|
| 2006/0095199 | A1* | 5/2006 | Lagassey | G07C 5/008 701/117 |
| 2010/0099461 | A1* | 4/2010 | Rahfaldt | H04M 1/72541 455/557 |
| 2010/0323615 | A1* | 12/2010 | Vock | H04M 1/60 455/26.1 |
| 2011/0319051 | A1* | 12/2011 | Reitnour | G01S 19/17 455/404.2 |
| 2013/0040600 | A1* | 2/2013 | Reitnour | H04W 4/90 455/404.2 |
| 2013/0100306 | A1* | 4/2013 | Bekiares | G08B 13/19689 348/211.99 |
| 2014/0057590 | A1* | 2/2014 | Romero | H04W 4/90 455/404.2 |
| 2014/0141841 | A1* | 5/2014 | Yeo | H04M 1/0202 455/566 |
| 2014/0218537 | A1* | 8/2014 | Nepo | G08B 15/004 348/158 |
| 2015/0334336 | A1* | 11/2015 | Chiu | H04N 5/4403 348/383 |
| 2017/0013464 | A1* | 1/2017 | Fish | H04W 12/12 |

FOREIGN PATENT DOCUMENTS

| | | |
|---|---|---|
| KR | 10-2015-0044454 A | 4/2015 |
| KR | 10-2016-0104332 A | 9/2016 |
| KR | 10-2016-0116492 A | 10/2016 |

\* cited by examiner

EMERGENCY LIFESAVING SYSTEM AND EMERGENCY LIFESAVING METHOD USING THE SAME

CROSS-REFERENCE TO RELATED APPLICATIONS

The present application is a continuation of International Patent Application No. PCT/KR2017/015103, filed on Dec. 20, 2017, which is based upon and claims the benefit of priority to Korean Patent Application No. 10-2017-0018897, filed on Feb. 10, 2017. The disclosures of the above-listed applications are hereby incorporated by reference herein in their entirety.

TECHNICAL FIELD

The present disclosure relates to an emergency lifesaving system and an emergency lifesaving method using the same, and more particularly, to an emergency lifesaving system capable of promptly handling an emergency situation and an emergency lifesaving method using the same.

BACKGROUND ART

Recently, as mobile terminals such as smart phones and tablet personal computers (PCs) have been recognized as necessities that can be most commonly seen nowadays due to the explosive increase in mobile communication subscribers, mobile terminal manufacturers have launched higher performance and multi-functional mobile terminals and telecommunication service providers have offered higher-level communication services and various additional services in line with this trend.

With the advancement of technology for identifying a user's location by tracking a source of a call from the user's mobile terminal among recently introduced communication services, mobile terminals and mobile communication services having a rescue request function have been introduced, whereby when an emergency situation occurs to a user, a call can be automatically made to a judicial agency, such as an emergency agency or a police station, by a mobile terminal that a user carries around to request a rescue.

However, it is difficult to understand an emergency situation of the user of the mobile terminal by simply identifying the user's location by tracking the source of the call from the mobile terminal. That is, when the emergency situation occurs, only the user's location can be identified but a level of a danger at the user's location cannot be determined, based on the source of the call from the user's mobile terminal.

If police officers or 119 emergency workers are dispatched to a scene of emergency during the request for the rescue using the mobile terminal, the dispatch of the police officers or the 119 emergency workers to the scene of emergency is not needed when the emergency situation can be handled by the user of the mobile terminal or when the emergency situation is canceled, and thus other emergency situations are difficult to handle.

Accordingly, existing rescue systems using a mobile terminal are disadvantageous in that when an emergency situation occurs, it is difficult to appropriately handle the emergency situation according to a level of a danger that a user of the mobile terminal faces.

This application is one of the results of GSIP (Global SaaS Incubating Project) (Project No. C0401-18-1018, 2018.04.01.-2018.11.30.), Project Name: Globalization and Develpment SaaS of the Mobile National Safety Emergency Service System) hosted by Ministry of Science and ICT (MSIT) and National IT Industry Promotion Agency (NIPA) in Republic of Korea.

DISCLOSURE

Technical Problem

The present invention is directed to an emergency lifesaving system, whereby a wireless terminal user who carries a wireless terminal is able to quickly generate an emergency rescue signal and check a situation in real time at a scene of emergency at which the wireless terminal user is located after the emergency rescue signal is generated, thereby promptly handling the situation according to a current level of a danger that the wireless terminal user faces, and an emergency lifesaving method using the same.

Technical Solution

According to an aspect of the present invention, an emergency lifesaving system includes a wireless terminal configured to download a program thereto via the Internet, and including a global positioning system (GPS) receiver, a tilt sensor, a microphone, and a camera; a downloadable program configured to be downloaded to the wireless terminal via the Internet, and including a rescue signal activation part for activating an emergency rescue signal when an emergency signal is input by a user via the wireless terminal, and a wireless terminal control part connected to the rescue signal activation part and configured to operate the GPS receiver, the microphone, and the camera of the wireless terminal when the rescue signal activation part activates the emergency rescue signal; a control server configured to communicate with the wireless terminal control part to determine whether a control signal operating the GPS receiver, the microphone, and the camera of the wireless terminal is generated, and receive emergency scene information and the emergency rescue signal from the wireless terminal when it is determined that the control signal is generated, the emergency scene information including location information of the wireless terminal, voice information in surroundings of the wireless terminal, and image information of the surroundings of the wireless terminal; and a dangerous situation handling terminal including a receiver configured to receive the emergency scene information by communicating with the control server, an emergency scene information output unit configured to output the emergency scene information received by the receiver to determine a level of a danger at a scene of emergency, and a situation handling unit configured to handle an emergency situation according to the level of the danger at the scene of emergency.

In one embodiment, the rescue signal activation part may be configured to display a button type icon on a touch screen of the wireless terminal to input the emergency signal, and the rescue signal activation part may be configured to activate the emergency rescue signal when inputting the emergency signal by pressing the icon is continued for a certain time period or when a number of times of performing a tilting operation generating a slope which is sensed by the tilt sensor is greater than or equal to a certain value.

In one embodiment, the control server may be configured to output, to the receiver, information regarding a user of the wireless terminal provided from a communication company server providing a communication service for the wireless terminal. The receiver may include an emergency scene information storage unit configured to update the emergency scene information therein in real time; a call information output unit configured to communicate with the control server to receive an emergency rescue signal from the wireless terminal, and output the information regarding the user of the wireless terminal corresponding to the emergency rescue signal and time information regarding a point in time when the emergency rescue signal is received; and a terminal connector configured to connect the dangerous situation handling terminal to the wireless terminal to establish direct communication between the dangerous situation handling terminal and the wireless terminal, when the emergency rescue signal is received by the call information output unit.

In one embodiment, the emergency scene information output unit may include a location information display unit configured to display, in the form of a map, the location information of the wireless terminal received via the receiver; a voice output unit configured to output, in the form of sound, the voice information in the surroundings of the wireless terminal received via the receiver; and an image display unit configured to display, in the form of an image, the image information of the surroundings of the wireless terminal received via the receiver. The situation handling unit may include a voice output selector configured to turn on or off the voice output unit; an image display selector configured to turn on or off the image display unit; a lifesaving agency caller configured to call a lifesaving agency; and a voice call unit configured to provide a function of making a voice call with the wireless terminal.

In one embodiment, the dangerous situation handling terminal may further include a situation end button; a call information storage unit configured to list and store information regarding users of the wireless terminal and time information regarding points in time when the emergency rescue signal is received, which are output from the call information output unit, when the situation end button is selected; and a voice data storage unit connected to the voice output unit and the voice call unit to store sound output from the voice output unit and content of a call made via the voice call unit when the voice output unit and the voice call unit are operated.

According to another aspect of the present invention, an emergency lifesaving method includes (a) activating an emergency rescue signal when an emergency signal is input by a user of a wireless terminal, and determining, by a control server, whether a control signal operating a global positioning system (GPS) receiver, a microphone, and a camera is generated by the wireless terminal having installed therein a program configured to control the GPS receiver, a tilt sensor, the microphone, and the camera when the emergency rescue signal is activated; (b) when it is determined that the control signal is generated, receiving, by the control server, an emergency scene information and the emergency rescue signal from the wireless terminal, the emergency scene information including location information of the wireless terminal, voice information in surroundings of the wireless terminal, and image information in the surroundings of the wireless terminal; and (c) receiving, by a dangerous situation handling terminal, the emergency scene information by communicating with the control server, outputting the received emergency scene information to determine a level of a danger at a scene of emergency, and handling an emergency situation.

In one embodiment, (c) may include updating and storing the emergency scene information received from the control server in real time; receiving an emergency rescue signal, which is transmitted from the wireless terminal, from the control server, and outputting information regarding the user of the wireless terminal corresponding to the received emergency rescue signal and time information regarding a point in time when the emergency rescue signal is received; displaying the location information of the wireless terminal, the voice information in the surroundings of the wireless terminal, and the image information of the surroundings of the wireless terminal which are included in the emergency scene information received from the control server; checking the emergency scene information, and trying to make a call or calling a lifesaving agency according to a level of a danger at a scene of emergency; and ending an emergency rescue process by generating a situation end signal for ending the emergency rescue process.

Advantageous Effects

In an emergency lifesaving system and an emergency lifesaving method using the same according to the present invention, a wireless terminal user who owns a wireless terminal may quickly generate an emergency rescue signal and check in real time a situation at a scene of emergency at which he or she is located after the emergency rescue signal is generated, thereby promptly taking actions according to a level of a danger that the wireless terminal user is currently facing.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

BEST MODES

An emergency lifesaving system according to the present invention includes a wireless terminal configured to download a program thereto via the Internet, and including a global positioning system (GPS) receiver, a tilt sensor, a microphone, and a camera; a downloadable program configured to be downloaded to the wireless terminal via the Internet, and including a rescue signal activation part for activating an emergency rescue signal when an emergency signal is input by a user via the wireless terminal, and a wireless terminal control part connected to the rescue signal activation part, and configured to operate the GPS receiver, the microphone, and the camera of the wireless terminal when the rescue signal activation part activates the emergency rescue signal; a control server configured to communicate with the wireless terminal control part to determine whether a control signal operating the GPS receiver, the microphone, and the camera of the wireless terminal is generated, and receive emergency scene information and the emergency rescue signal from the wireless terminal when it is determined that the control signal is generated, the emergency scene information including location information of the wireless terminal, voice information in surroundings of the wireless terminal, and image information of the surroundings of the wireless terminal; and a dangerous situation handling terminal including a receiver configured to receive the emergency scene information by communicating with the control server; an emergency scene information output unit configured to output the emergency scene information received by the receiver to determine a level of a danger at a scene of emergency; and a situation handling unit configured to handle an emergency situation according to the level of the danger at the scene of emergency.

An emergency lifesaving method includes (a) activating an emergency rescue signal when an emergency signal is input by a user of a wireless terminal, and determining, by a control server, whether a control signal operating a global positioning system (GPS) receiver, a microphone, and a camera is generated by the wireless terminal having installed therein a program configured to control the GPS receiver, a tilt sensor, the microphone, and the camera when the emergency rescue signal is activated; (b) when it is determined that the control signal is generated, receiving, by the control server, an emergency scene information and the emergency rescue signal from the wireless terminal, the emergency scene information including location information of the wireless terminal, voice information in surroundings of the wireless terminal, and image information in the surroundings of the wireless terminal; and (c) receiving, by a dangerous situation handling terminal, the emergency scene information by communicating with the control server, outputting the received emergency scene information to determine a level of a danger at a scene of emergency, and handling an emergency situation.

Modes of the Invention

Hereinafter, an emergency lifesaving system and an emergency lifesaving method using the same will be described in detail with reference to the accompanying drawings below. Various changes in form and details may be made in the present invention and thus exemplary embodiments are illustrated in the drawings and described in detail herein. However, the present invention should not be construed as being limited to specific embodiments and should be understood to cover all modification, equivalents, and alternatives falling within the idea and technical scope of the invention. When the drawings are described herein, similar reference numerals are assigned to similar components. In the accompanying drawings, the sizes of components are exaggerated for clarity.

As used herein, although the terms "first", "second", etc., may be used herein to describe various components, the components should not be limited by these terms. These terms are only used to distinguish one component from another component. For example, a first component could be termed a second component without departing from the scope of the present invention. Similarly, a second component could be termed a first component.

The terminology used herein is for the purpose of describing specific embodiments only and is not intended to be limiting of the invention. As used herein, the singular forms "a", "an" and "the" are intended to include the plural forms as well, unless the context clearly indicates otherwise. It will be understood that the terms "comprises" and/or "comprising," when used herein, specify the presence of stated features, integers, steps, operations, components, parts, or a combination thereof but do not preclude the presence or addition of one or more other features, integers, steps, operations, components, parts, or a combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
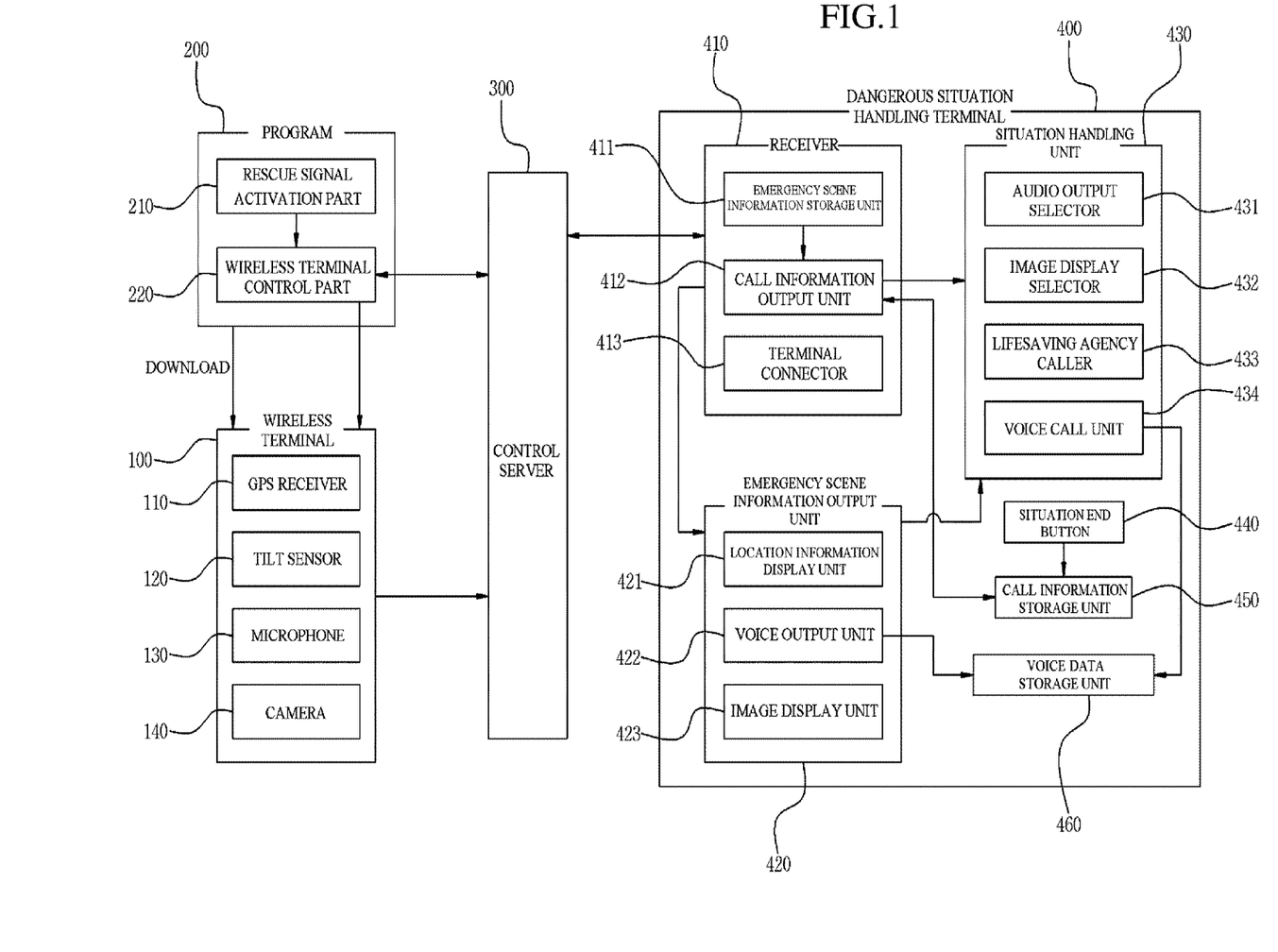
FIG. 1 is a block diagram of an emergency lifesaving system according to an embodiment of the present invention.

FIG. 1 is a block diagram of an emergency lifesaving system according to an embodiment of the present invention.

Referring to FIG. 1, the emergency lifesaving system according to an embodiment of the present invention may include a wireless terminal 100, a program 200 downloadable to the wireless terminal 100, a control server 300, and a dangerous situation handling terminal 400.

The wireless terminal 100 is a terminal which is configured to download a program thereto via the Internet and includes a global positioning system (GPS) receiver 110, a tilt sensor 120, a microphone 130, and a camera 140. The wireless terminal 100 may be a terminal that an individual can carry, e.g., a smart phone or a tablet personal computer (PC).

The program 200 may be provided to be downloaded to the wireless terminal 100 via the Internet, and installed in the wireless terminal 100. The program 200 may include a rescue signal activation part 210 and a wireless terminal control part 220.

Figure 2:
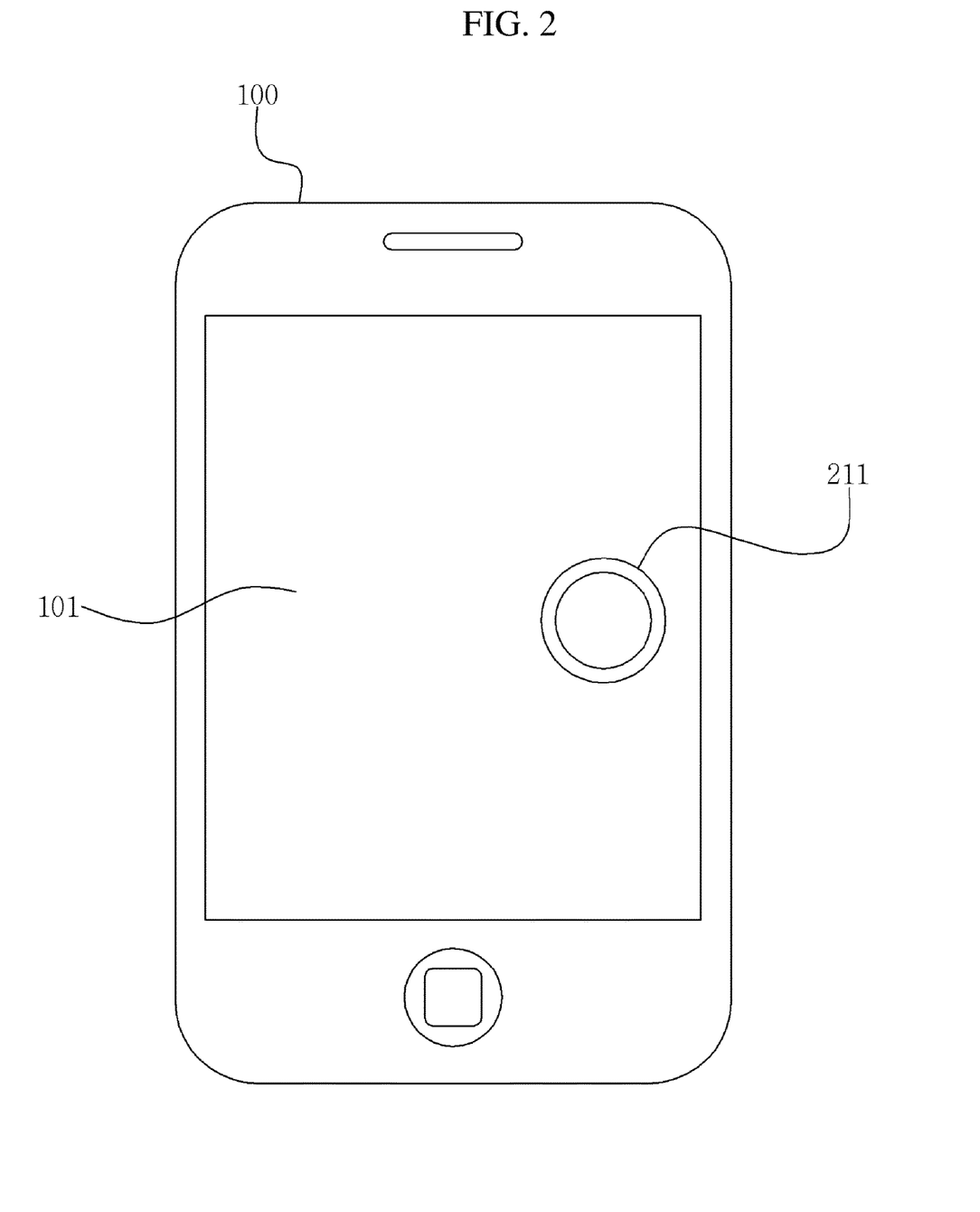
FIG. 2 is a diagram illustrating an example of a form in which an icon provided using a rescue signal activation part of FIG. 1 is displayed on a screen of a wireless terminal.

The rescue signal activation part 210 may allow a user of the wireless terminal 100 to request an emergency rescue. To this end, the rescue signal activation part 210 is configured to display a button type icon 211 on a touch screen 101 of the wireless terminal 100, via which the user may input an emergency signal. A state in which the button type icon 211 is provided on the touch screen 101 of the wireless terminal 100 is illustrated in FIG. 2. The icon 211 may be provided to be movable on the touch screen 101 of the wireless terminal 100, and be kept exposed in a locked state of the touch screen 101 of the wireless terminal 100 and an open state of the touch screen 101 in which the wireless terminal 100 may be manipulated.

The rescue signal activation part 210 may be configured to activate an emergency rescue signal when inputting the emergency signal by a user by pressing the icon 211 on the wireless terminal 100 is continued for a certain time period or more and when a number of times of performing a tilting operation generating a slope, which is sensed by the tilt sensor 120 of the wireless terminal 100, is greater than or equal to a certain number. For example, the rescue signal activation part 210 may be configured to activate the emergency rescue signal when the emergency signal is continuously input for five seconds or more or when the number of times of performing the tilting operation generating a slope, which is sensed by the tilt sensor 120, is five or more.

The wireless terminal control part 220 may be connected to the rescue signal activation part 210, and configured to operate the GPS receiver 110, the microphone 130, and the camera 140 of the wireless terminal 100 when the emergency rescue signal is activated by the rescue signal activation part 210 and thus a control signal is generated.

The control server 300 may be configured to communicate with the wireless terminal 100 to check whether the wireless terminal control part 220 of the program 200 provided by the wireless terminal 100 is executed. That is, the control server 300 may be configured to communicate with the wireless terminal 100 to determine whether the wireless terminal control part 220 generates a control signal operating the GPS receiver 110, the microphone 130, and the camera 140 of the wireless terminal 100. When it is determined that the wireless terminal control part 220 generates the control signal, the control server 300 may receive, from the wireless terminal 100, emergency scene information, including location information of the wireless terminal 100, voice information in surroundings of the wireless terminal 100, image information regarding the surroundings of the wireless terminal 100, and the emergency rescue signal activated by the wireless terminal 100.

Furthermore, the control server 300 may be configured to output information regarding the user of the wireless terminal 100, which is provided from a communication company server providing a communication service of the wireless terminal 100, to a receiver 410 of the dangerous situation handling terminal 400 which will be described later.

The dangerous situation handling terminal 400 may communicate with the control server 300, and is provided to handle a dangerous situation corresponding to the emergency rescue signal. The dangerous situation handling terminal 400 may include the receiver 410 configured to communicate with the control server 300 to receive the emergency scene information, an emergency scene information output unit 420 configured to output the emergency scene information received by the receiver 410 and determines a level of a danger at a scene of emergency, and a situation handling unit 430 configured to handle an emergency situation corresponding to the level of the danger at the scene of emergency.

The receiver 410 may include an emergency scene information storage unit 411, a call information output unit 412, and a terminal connector 413.

The emergency scene information storage unit 411 may be updated in real time with emergency scene information received from the control server 300 by establishing communication between the receiver 40 and the control server 300.

The call information output unit 412 may be configured to receive the emergency rescue signal from the wireless terminal 100 by communicating with the control server 300, and output information regarding the user of the wireless terminal 100 corresponding to the received emergency rescue signal and time information of a point in time when the emergency rescue signal is received.

The terminal connector 413 may be configured to connect the dangerous situation handling terminal 400 to the wireless terminal 100 so as to establish direct communication between the dangerous situation handling terminal 400 and the wireless terminal 100 when the emergency rescue signal is received by the call information output unit 412. The terminal connector 413 may be configured to be operated according to a system administrator's selection. For example, the dangerous situation handling terminal 400 may be a button type terminal.

The emergency scene information output unit 420 may include a location information display unit 421, a voice output unit 422, and an image display unit 423. The location information unit 421 may display the location information of the wireless terminal 100, which is received via the receiver 410, in the form of a map. The voice output unit 422 may output voice information in the surroundings of the wireless terminal 100, which is received via the receiver 410, in the form of sound. The video display unit 423 may display the image information of the surroundings of the wireless terminal 100, which is received via the receiver 410, in the form of an image. The system administrator may determine the level of the danger at the scene of emergency on the basis of information provided by the emergency scene information output unit 420.

The status processor 430 may include an audio output selector 431 which turns on/off the voice output unit 422, an image display selector 432 which turns on/off the image display unit 423, a lifesaving agency caller 433 which calls a lifesaving agency, and a voice call unit 434 which provides a function of making a voice call with the wireless terminal 100. The situation handling unit 430 may be controlled according to the level of the danger at the scene of emergency which is checked and determined by a system administrator using the emergency scene information output unit 420.

Figure 3:
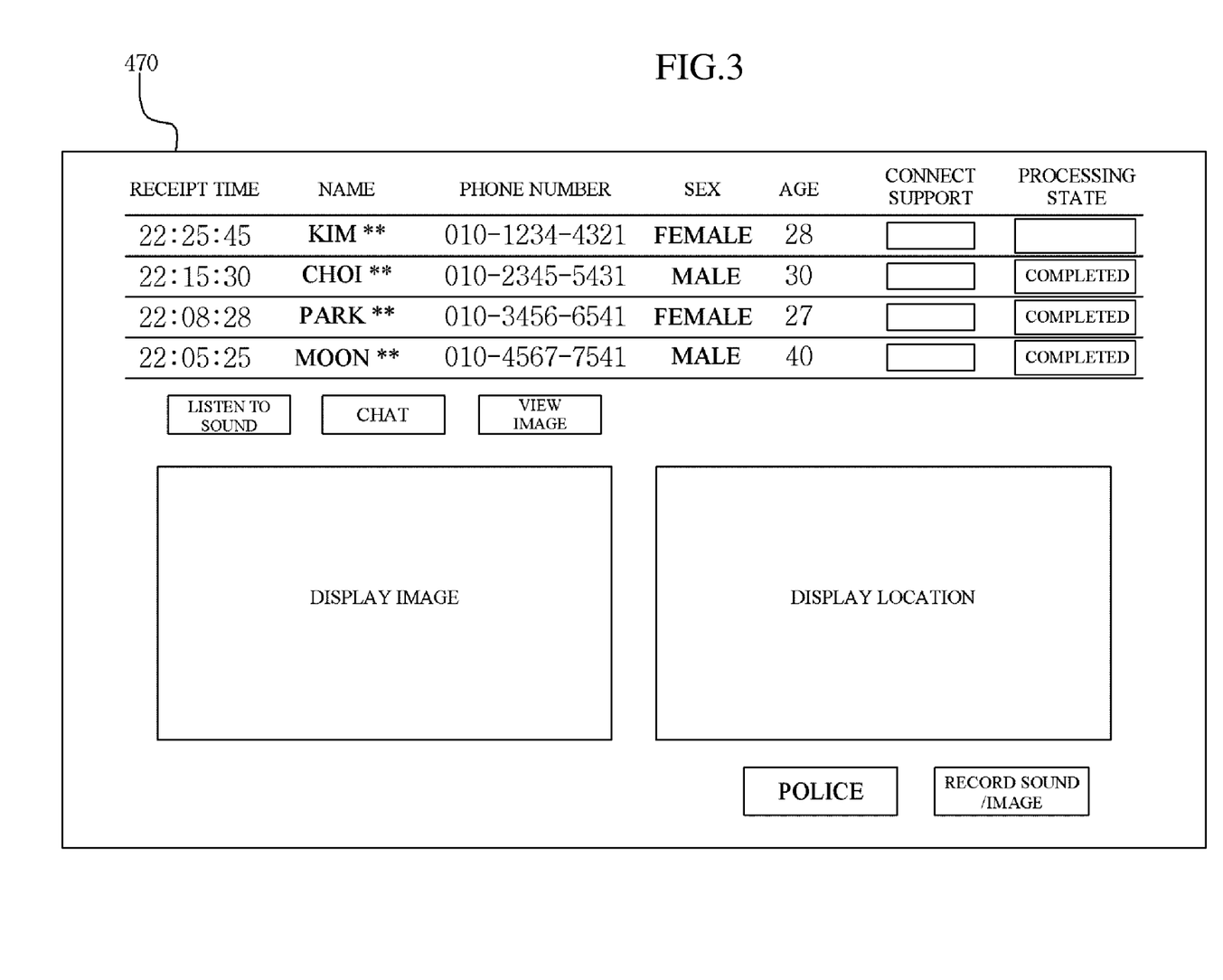
FIG. 3 is a diagram illustrating an example of information displayed on a dangerous situation handling terminal of FIG. 1.
Figure 4:
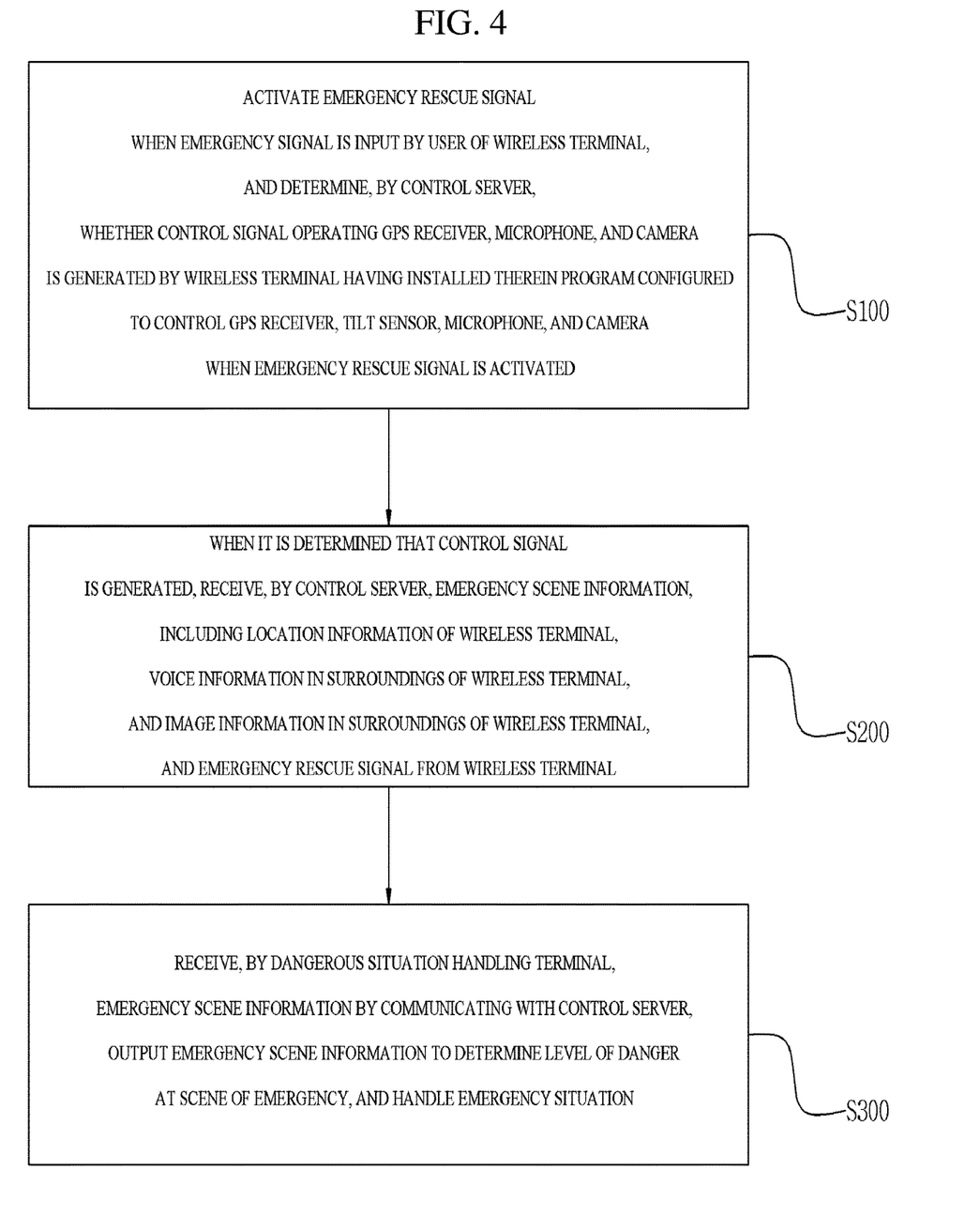
FIG. 4 is a flowchart illustrating a flow of an emergency lifesaving method according to an embodiment of the present invention.

FIG. 3 is a diagram illustrating an example of information displayed on a dangerous situation handling terminal 400 of FIG. 1. The dangerous situation handling terminal 400 may include a large screen 470. A region to which information of users of the wireless terminal 100 output via the call information output unit 412 of the receiver 410 is output, and the location information display unit 421 displaying location information of the wireless terminal 100 in the form of a map, and the image display unit 423 displaying image information of surroundings of the wireless terminal 100 in the form of an image may be provided on the large screen 470. Accordingly, as illustrated in FIG. 4, emergency scene information may be viewed on the large screen 470.

The emergency lifesaving system according to an embodiment of the present invention may further include a situation end button 440, a call information storage unit 450, and a voice data storage unit 460.

The situation end button 440 may be selected by a system administrator to generate a situation end signal when handling an emergency situation is completed by the dangerous situation handling terminal 400 according to a level of a danger at a scene of emergency.

When the situation end signal is generated by selecting the situation end button 440, the call information storage unit 450 may list and store information of users of the wireless terminal 100 and time information of points in time when the emergency rescue signal is received, which are output from the call information output unit 412.

The voice data storage unit 460 may be connected to the voice output unit 422 and the voice call unit 434 to store sound output from the voice output unit 422 and the content of a call made by the voice call unit 434 when the voice output unit 422 and the voice call unit 434 are operated.

Figure 5:
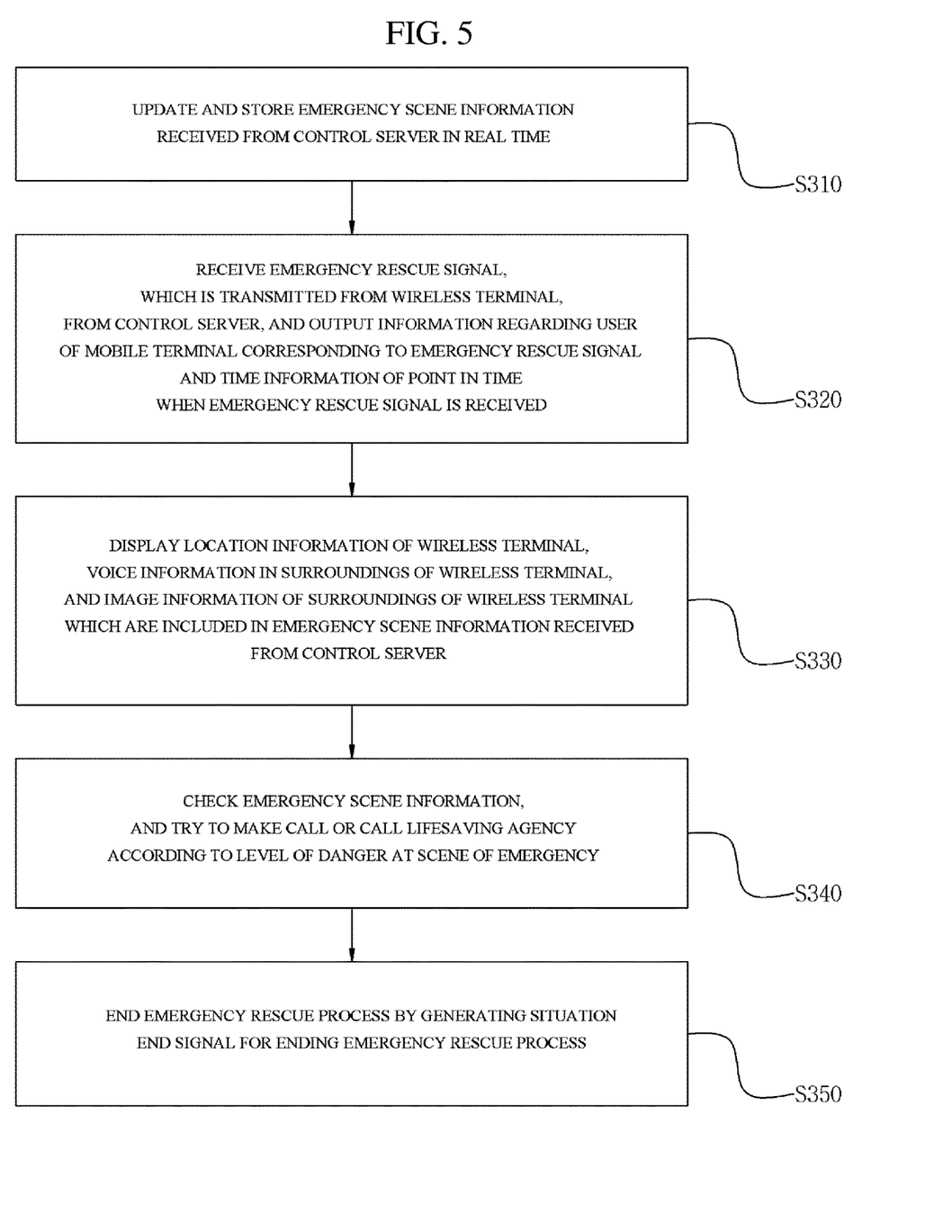
FIG. 5 is a flowchart illustrating a flow of operation (c) to be described with reference to FIG. 3.

An emergency lifesaving method using an emergency lifesaving system as described above according to an embodiment of the present invention will be described with reference to FIGS. 4 and 5 below. FIG. 4 is a flowchart illustrating a flow of an emergency lifesaving method according to an embodiment of the present invention. FIG. 5 is a flowchart illustrating a flow of operation (c) to be described with reference to FIG. 3.

Referring to FIG. 4, an emergency lifesaving method according to an embodiment may include (a) activating an emergency rescue signal when an emergency signal is input by a user of a wireless terminal, and determining, by a control server, whether a control signal operating a GPS receiver, a microphone, and a camera is generated by the wireless terminal having installed therein a program configured to control the GPS receiver, a tilt sensor, the microphone, and the camera when the emergency rescue signal is activated (S100); (b) when it is determined that the control signal is generated, receiving emergency scene information and the emergency rescue signal from the wireless terminal by the control server, the emergency scene information including location information of the wireless terminal, voice information in surroundings of the wireless terminal, and image information of the surroundings of the wireless terminal (S200); and (c) communicating, by a dangerous situation handling terminal, with the control server to receive the emergency scene information, outputting the emergency scene information to determine a level of a danger at a scene of emergency, and handling an emergency situation according to the level of the danger at the scene of emergency (S300).

(a) is performed when the user of the wireless terminal inputs the emergency signal. For example, (a) is performed when the user of the wireless terminal presses a button type icon on a touch screen of the wireless terminal for five seconds or more or when the user shakes the wireless terminal five times or more. When the emergency signal is input by the user, the rescue signal activation part 210 of the program 200 activates the emergency rescue signal, and the wireless terminal control part 220 of the program 200 generates the control signal to operate the GPS receiver 110, the microphone 130, and the camera 140 of the wireless terminal 100. In this case, the generated control signal may be checked by the control server 300.

Operation (c) is performed by the dangerous situation handling terminal 400. Referring to FIG. 4, operation (c) may include updating and storing emergency scene information received from the control server in real time (S310); receiving the emergency rescue signal, which is transmitted from the wireless terminal, from the control server, and outputting information regarding the user of the mobile terminal corresponding to the received emergency rescue signal and time information of a point in time when the emergency rescue signal is received (S320); displaying the location information of the wireless terminal, the voice information in the surroundings of the wireless terminal, and the image information of the surroundings of the wireless terminal which are included in the emergency scene information received from the control server (S330); checking the emergency scene information, and trying to make a call or calling a lifesaving agency according to the level of the danger at the scene of emergency (S340); and ending an emergency rescue process by generating a situation end signal for ending the emergency rescue process (S350).

In operation S310, the emergency scene information is updated and stored in real time in the emergency scene information storage unit 411 of the receiver 410 of the dangerous situation handling terminal 400.

In operation S320, the emergency rescue signal is received from the wireless terminal 100 via the call information output unit 412 of the dangerous situation handling terminal 400, and information regarding the user of the wireless terminal 100 corresponding to the emergency rescue signal and the time information of the point in time when the emergency rescue signal is received are output. For example, the information regarding the user and the time information may be displayed at a side of the large screen 470 of the dangerous situation handling terminal 400.

In operation S330, a system administrator may operate the terminal connector 413 to allow the dangerous situation handling terminal 400 to directly communicate with the wireless terminal 100. Operation S330 is a process of permitting an emergency rescue support. After the terminal connector 413 is operated, the location information of the wireless terminal, the voice information in the surroundings of the wireless terminal, and the image information of the surroundings of the wireless terminal may be displayed and output via the location information display unit 421, the voice output unit 422, and the image display unit 423. In this case, when the voice output unit 422 is operated, the voice data storage unit 460 stores sound output from the voice output unit 422.

In operation S340, the system administrator may determine the level of the danger at the scene of emergency by checking the emergency scene information displayed and output via the location information display unit 421, the voice output unit 422, and image display unit 423, and operate the voice call unit 434 to try to make a call to the user of the wireless terminal 100 generating the emergency rescue signal when the level of the danger at the scene of emergency is a level at which a call may be made or promptly operate the lifesaving agency caller 433 to call a lifesaving agency, e.g., a police station, a fire station, a 119 rescue unit, or the like when the level of the danger at the scene of emergency is a high risk level at which a call cannot be made.

In addition, in operation S340, when the voice call unit 434 is operated, the content of a call made by the voice call unit 434 is stored in the voice data storage unit 460.

In operation S350, the system administrator ends the emergency rescue process by generating the situation end signal by operating the situation end button 440. When the situation end signal is generated by operating the situation end button 440, the call information storage unit 450 lists and stores information of users of the wireless terminal 100 and time information regarding points in time when the emergency rescue signal is received, which are output from the call information output unit 412.

With the use of an emergency lifesaving system and an emergency lifesaving method using the same according to an embodiment of the present invention, a wireless terminal user who owns a wireless terminal may quickly generate an emergency rescue signal and check in real time a situation at a scene of emergency at which he or she is located after the emergency rescue signal is generated, thereby promptly taking actions according to a level of a danger that the wireless terminal user is currently facing.

The above description of the embodiments set forth herein is provided so that those of ordinary skill in the art can easily use or implement the present invention. It will be apparent to those of ordinary skill in the art that various changes may be made in these embodiments and general principles defined herein are applicable to other embodiments without departing from the scope of the invention. Accordingly, the present invention should not be understood as being limited to the embodiments set forth herein and should be understood to fall within a broadest range consistent with the principles and novel features presented herein.

INDUSTRIAL APPLICABILITY

An emergency lifesaving system and an emergency lifesaving method using the same according to the present invention relate to a technique for appropriately handling an emergency situation according to a level of a danger that a user of a mobile terminal faces and are applicable to mobile terminals which are easy to carry, etc.

What is claimed is:

1. An emergency lifesaving system comprising:
   a wireless terminal configured to download a program thereto via the Internet, the wireless terminal including a global positioning system (GPS) receiver, a tilt sensor, a microphone, and a camera;
   a downloadable program configured to be downloaded to the wireless terminal via the Internet,
   wherein the program comprises:
   a rescue signal activator that activates an emergency rescue signal when an emergency signal is input by a user of the wireless terminal via the wireless terminal; and
   a wireless terminal controller connected to the rescue signal activator, and configured to operate the GPS receiver, the microphone, and the camera of the wireless terminal when the rescue signal activator activates the emergency rescue signal;
   a control server configured to communicate with the wireless terminal controller to determine whether a control signal operating the GPS receiver, the microphone, and the camera of the wireless terminal is generated, and receive emergency scene information and the emergency rescue signal from the wireless terminal when it is determined that the control signal is generated, the emergency scene information including location information of the wireless terminal, voice information in surroundings of the wireless terminal, and image information of the surroundings of the wireless terminal; and
   a dangerous situation handling terminal comprising:
   a receiver configured to receive the emergency scene information by communicating with the control server;
   an emergency scene information outputter configured to output the emergency scene information received by the receiver to determine a level of a danger at a scene of emergency; and
   a situation handler configured to handle an emergency situation according to the level of the danger at the scene of emergency,
   wherein the rescue signal activator is configured to display a button type icon on a touch screen of the wireless terminal to input the emergency signal,
   wherein the rescue signal activator is configured to activate the emergency rescue signal when inputting the emergency signal by pressing the icon is continued for a certain time period and a number of times of performing a tilting operation generating a slope which is sensed by the tilt sensor is greater than or equal to a certain value,
   wherein the control server is configured to output, to the receiver, information regarding the user of the wireless terminal provided from a communication company server providing a communication service for the wireless terminal,
   wherein the receiver comprises:
   an emergency scene information storage configured to update the emergency scene information therein in real time;
   a call information outputter configured to communicate with the control server to receive the emergency rescue signal from the wireless terminal, and output the information regarding the user of the wireless terminal corresponding to the emergency rescue signal and time information regarding a point in time when the emergency rescue signal is received; and
   a terminal connector configured to connect the dangerous situation handling terminal to the wireless terminal to establish direct communication between the dangerous situation handling terminal and the wireless terminal, when the emergency rescue signal is received by the call information outputter, and
   wherein the dangerous situation handling terminal further comprises:
   a situation end button;
   a call information storage configured to list and store information regarding the user of the wireless terminal and time information regarding points in time when the emergency rescue signal is received, which are output from the call information outputter, when the situation end button is selected;
   a voice outputter configured to output, in the form of sound, the voice information in the surroundings of the wireless terminal received via the receiver; and
   a voice data storage connected to the voice outputter and the voice caller configured to store sound output from the voice outputter and content of a call made via the voice caller when the voice outputter and the voice caller are operated.

2. The emergency lifesaving system of claim 1, wherein the emergency scene information outputter comprises:
   a location information display configured to display, in the form of a map, the location information of the wireless terminal received via the receiver;
   an image display configured to display, in the form of an image, the image information of the surroundings of the wireless terminal received via the receiver,
   wherein the situation handler comprises:
   a voice output selector configured to turn on or off the voice outputter;
   an image display selector configured to turn on or off the image display; and
   a lifesaving agency caller configured to call a lifesaving agency, and
   wherein the voice caller is configured to provide a function of making a voice call with the wireless terminal.

3. An emergency lifesaving method comprising:
   (a) activating an emergency rescue signal when an emergency signal is input by a user of a wireless terminal, and determining, by a control server, whether a control signal operating a global positioning system (GPS) receiver, a microphone, and a camera is generated by the wireless terminal having installed therein a program configured to control the GPS receiver, a tilt sensor, the microphone, and the camera when the emergency rescue signal is activated;
   (b) when it is determined that the control signal is generated, receiving, by the control server, an emergency scene information and the emergency rescue signal from the wireless terminal, the emergency scene information including location information of the wireless terminal, voice information in surroundings of the wireless terminal, and image information in the surroundings of the wireless terminal;
   (c) receiving, by a dangerous situation handling terminal, the emergency scene information by communicating with the control server, outputting the received emergency scene information to determine a level of a danger at a scene of emergency, and handling an emergency situation according to the level of the danger at the scene of emergency;

(d) displaying, by the wireless terminal, a button type icon on a touch screen of the wireless terminal to input the emergency signal,
wherein the emergency rescue signal is activated when inputting the emergency signal by pressing the icon is continued for a certain time period and a number of times of performing a tilting operation generating a slope which is sensed by the tilt sensor is greater than or equal to a certain value;

(e) outputting, by the control server, to the dangerous situation handling terminal, information regarding the user of the wireless terminal provided from a communication company server providing a communication service for the wireless terminal;

(f) updating, by the dangerous situation handling terminal, the emergency scene information therein in real time, (g) communicating, by the dangerous situation handling terminal, with the control server to receive the emergency rescue signal from the wireless terminal, and outputting the information regarding the user of the wireless terminal corresponding to the emergency rescue signal and time information regarding a point in time when the emergency rescue signal is received;

(h) connecting, by the dangerous situation handling terminal, the dangerous situation handling terminal to the wireless terminal to establish direct communication between the dangerous situation handling terminal and the wireless terminal, when the emergency rescue signal is received by the dangerous situation handling terminal;

(i) listing and storing, by the dangerous situation handling terminal, information regarding the user of the wireless terminal and time information regarding points in time when the emergency rescue signal is received, which are output from the dangerous situation handling terminal, when a situation end button of the dangerous situation handling terminal is selected; and (j) outputting, by the dangerous situation handling terminal, in the form of sound, the voice information in the surroundings of the wireless terminal received via the dangerous situation handling terminal and storing sound output from the dangerous situation handling terminal and content of a call made via the dangerous situation handling terminal when the dangerous situation handling terminal is operated.

4. The emergency lifesaving method of claim 3, wherein (c) comprises:

updating and storing the emergency scene information received from the control server in real time;

receiving the emergency rescue signal, which is transmitted from the wireless terminal, from the control server, and outputting the information regarding the user of the wireless terminal corresponding to the received emergency rescue signal and the time information regarding the point in time when the emergency rescue signal is received;

displaying the location information of the wireless terminal, the voice information in the surroundings of the wireless terminal, and the image information of the surroundings of the wireless terminal which are included in the emergency scene information received from the control server;

checking the emergency scene information, and trying to make a call or calling a lifesaving agency according to the level of the danger at the scene of emergency; and ending an emergency rescue process by generating a situation end signal for ending the emergency rescue process.

* * * * *